United States Patent [19]

Kantorowich

[11] Patent Number: 4,492,489
[45] Date of Patent: Jan. 8, 1985

[54] MORTICE AND TENON JOINT

[75] Inventor: Roy H. Kantorowich, Manchester, England

[73] Assignee: The Victoria University of Manchester, Manchester, England

[21] Appl. No.: 525,028

[22] Filed: Aug. 22, 1983

[51] Int. Cl.³ .......................... B25G 3/00; F16D 1/00
[52] U.S. Cl. ................................ 403/319; 403/324; 403/263; 403/247
[58] Field of Search ............... 403/252, 247, 321, 231, 403/263, 264, 319, 324

[56] References Cited

U.S. PATENT DOCUMENTS 2,562,483 7/1951 Bender ............................. 403/247

FOREIGN PATENT DOCUMENTS 73518 12/1951 Denmark ............................. 403/247
918110 9/1954 Fed. Rep. of Germany ...... 403/231

OTHER PUBLICATIONS

The Technique of Furniture Making by Ernest Joyce, pp. 187, 188, published 1970.
Article "Mortise and Tenon" from Periodical Fire Woodwoorking Summer 1976.

Primary Examiner—Andrew V. Kundrat
Attorney, Agent, or Firm—LeBlanc, Nolan, Shur & Nies

[57] ABSTRACT

A mortice and tenon joint of two structural members which avoids the protrusion of the tenon beyond the mortice. Across the tenon (11) of one member (10) there is cut a dovetail aperture or slot (12), and a movable tapering wedge (16) of similar dovetail cross-section is slidably housed within a tapering channel also of similar dovetail cross-section which crosses the mortice (14) of the other member (13) such that when the tenon (11) is inserted wholly into the mortice (14) the wedge (16) may be driven along the tapered channel to become firmly engaged within the dovetail aperture or slot (12) thus to lock the members (10, 13) together and prevent them from separating until the wedge (16) is withdrawn.

7 Claims, 6 Drawing Figures

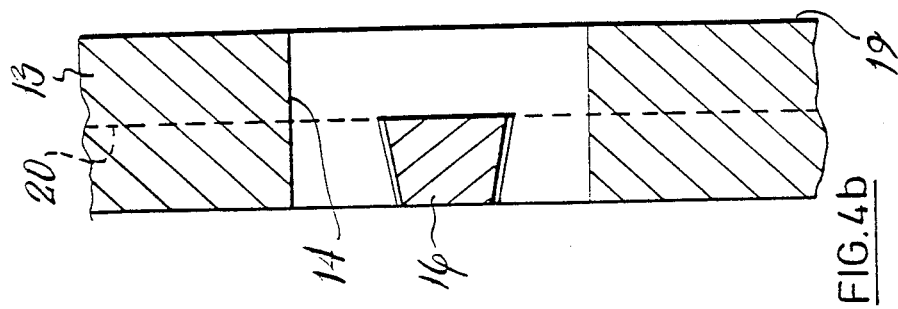
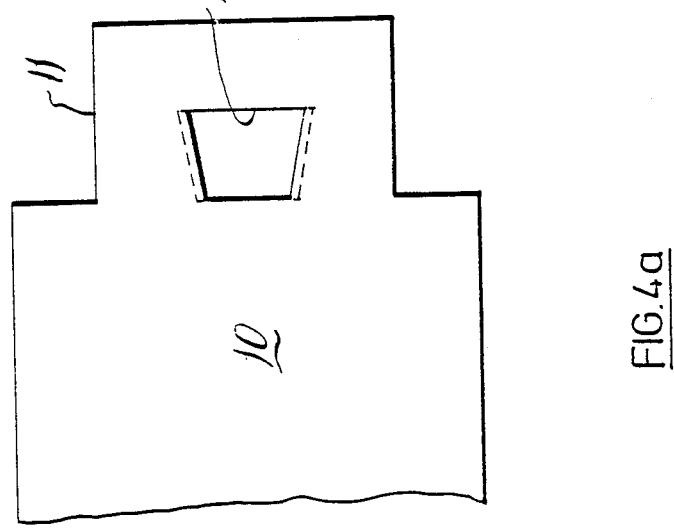
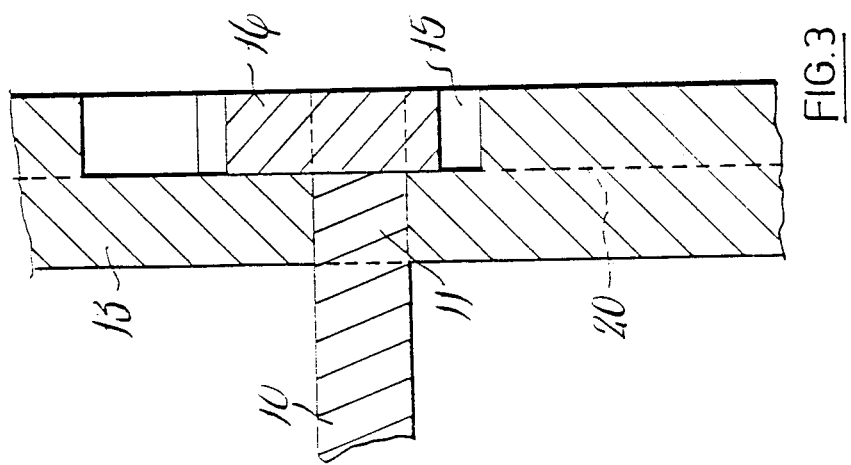

MORTICE AND TENON JOINT

This invention concerns a mortice and tenon joint of two structural members which may be used, for example, in the assembly of dismountable furniture.

Mortice and tenon joints which can be dismantled are known in which the tenon extends through and beyond the mortice and is apertured to receive a loose peg or wedge which bears against the face of the morticed member to prevent the tenon from being withdrawn therefrom. Such a jointing system is used in the assembly of benches wherein the seat, or a reinforcing strut beneath the seat, is joined to the end walls or legs of the bench utilising the wedge action referred to above.

An object of the present invention is to provide a mortice and tenon joint which can be locked by a wedge action, and is thus dismountable but wherein the projection of the tenon beyond the mortice member is avoided.

According to the present invention there is provided a mortice and tenon joint of two structural members, characterised in that across the tenon of one member there is cut a dovetail aperture or slot, and in that a movable wedge having a similar dovetail cross-section is slidably housed within a channel also of similar dovetail cross-section which crosses the mortice of the other member, whereby when the tenon is inserted into the mortice, the wedge may be driven along the channel to become firmly engaged within said dovetail aperture or slot to prevent the members from separating until the wedge is withdrawn.

Examples of the invention will now be described by way of example only with reference to the accompanying drawings in which:

FIG. 3 is a section taken along the line III—III of FIG. 2; and

FIGS. 4a and 4b are views similar to FIGS. 1a and 1b, illustrating a modified form of the joint.

Figure 2:
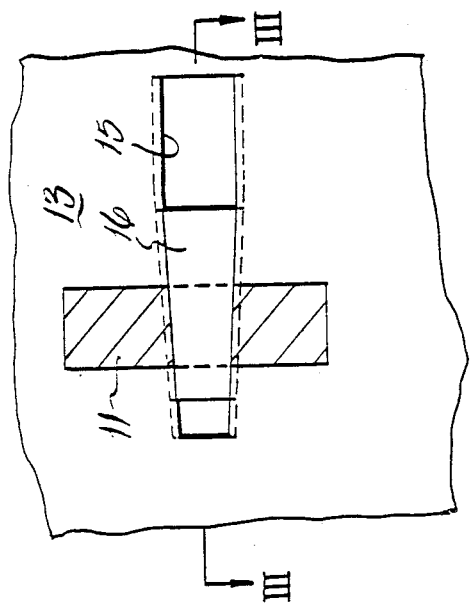
FIG. 2 is a view taken in the direction of arrow A.
Figure 1B:
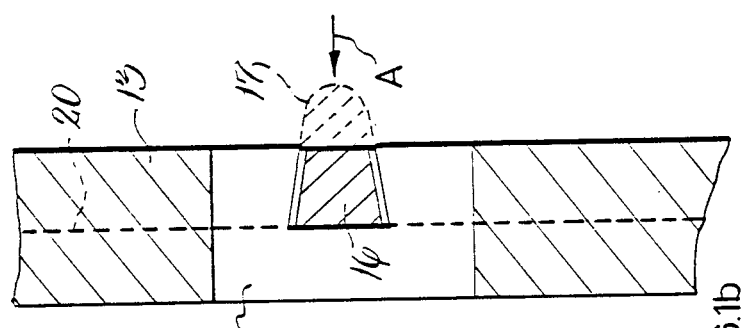
FIGS. 1a and 1b are fragmentary views of two members to be jointed.
Figure 1A:
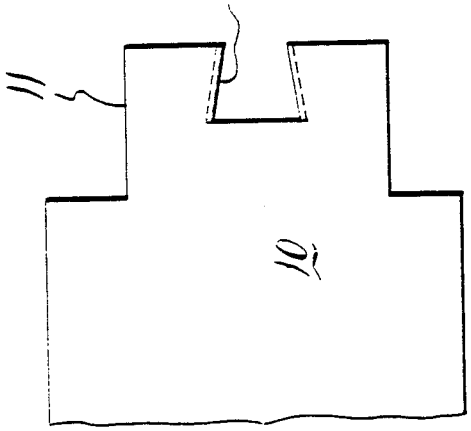

Member 10 has a portion 11 cut to form a tenon and slotted at 12 in dovetail configuration. Member 13 is morticed at 14 to receive the tenon 11. Crossing the mortice 14 is a transverse tapering channel 15 whose depth is approximately equivalent to one half of the thickness of the member 13. As will be seen from FIG. 1b the channel 15 is of dovetail cross-section equivalent to that of the slot 12 in member 10, and a tapering wedge 16 of similar cross-section is captive within the channel 15.

Thus, as may be seen from FIG. 3 with the wedge 16 withdrawn to the right-hand end of the channel 15, the tenon 11 is introduced into the mortice 14 whereupon the wedge 16 is driven to the left to become firmly engaged within the dovetail slot 12 thus locking the joint and preventing the members from separating.

The outer face of the wedge 16 may be flush with the surface of member 13 thus to avoid any protuberance from the joint. Alternatively, the wedge may be shaped as indicated by dotted line 17 to provide a finger grip to assist in moving the wedge into and from engagement with the slot 12.

Referring now to FIGS. 4a and 4b, in an alternative embodiment, the dovetail slot 12 is replaced by an aperture 18 passing through the root portion of the tenon 11, and in this case, the channel 15 and the wedge 16 are disposed on the adjacent face of the member 13. In this way, the outer face 19 of the joint will be substantially plain. Clearly, machining of aperture 18 is more complex than the dovetail slot 12, and consequently may be less advantageous in some cases.

For ease of machining the channel 15 and insertion of the wedge 16, the member 13 may be comprised of two separate portions joined face-to-face as illustrated by the dotted line 20.

To ensure that the joint is locked tightly the depth of slot 12 or aperture 18 may be slightly greater than the depth of channel 15, and at least some of the co-operating faces of the tenon 11 and mortice 14 can be tapered, such that when the wedge 16 is driven into engagement with the dovetail aperture or slot, the action is to draw the tenon tightly into the mortice.

It is not intended to limit the invention to the above examples only, many variations, such as might readily occur to one skilled in the art, being possible without departing from the scope of the invention.

For example, the wedge 16 may be captive within a separate housing defining the channel 15 and which is secured to the outer face of the member 13 thus, avoiding the construction of the latter as two portions joined face-to-face.

I claim:

1. A mortice and tenon joint of two structural members, characterized in that across the tenon of one member there is cut a passage of tapered cross section, and in that a movable wedge having a similar tapered cross-section is slidably housed within a channel also of similar tapered cross-section which intersects the mortice of the other member, whereby when the tenon is inserted into the mortice, the wedge may be driven along the channel to become firmly engaged within said passage to prevent the members from separating until the wedge is withdrawn.

2. A mortice and tenon joint according to claim 1, wherein said wedge is tapered longitudinally, and said channel is correspondingly tapered, the depth of said channel and of said wedge being approximately equivalent to one half of the thickness of the morticed member in which they are housed.

3. A mortice and tenon joint according to claim 1, wherein said wedge is captive within said channel.

4. A mortice and tenon joint according to claim 1, wherein the depth of the wedge and the channel are substantially equal whereby the outer face of the wedge is flush with the adjacent surface of the morticed member thus to avoid any protuberance from the joint.

5. A mortice and tenon joint according to claim 1, wherein the depth of said passage is slightly greater than the depth of the channel in which said wedge is housed such that when the wedge is driven into engagement with the passage, the action is to draw the tenon tightly into the mortice.

6. A mortice and tenon joint according to claim 1, wherein said passage is a extending dovetail slot from the outermost edge of the tenon of said one member, said channel and wedge being flush with the face of morticed member remote from that through which the tenon is introduced.

7. A mortice and tenon joint according to claim 1, wherein said passage is formed as an aperture through the root portion of the tenon of said one member, said channel and wedge being disposed flush with that face of the morticed member through which the tenon is introduced, whereby the wedge may be driven through said passage after the tenon has been wholly inserted within the mortice.

* * * * *